May 13, 1958 — W. F. MORRISON — 2,834,252

SEMI-RIMLESS SPECTACLE MOUNTING

Filed Feb. 5, 1951 — 2 Sheets-Sheet 1

WALTER F. MORRISON,
INVENTOR.

BY Hazard & Miller
ATTORNEYS

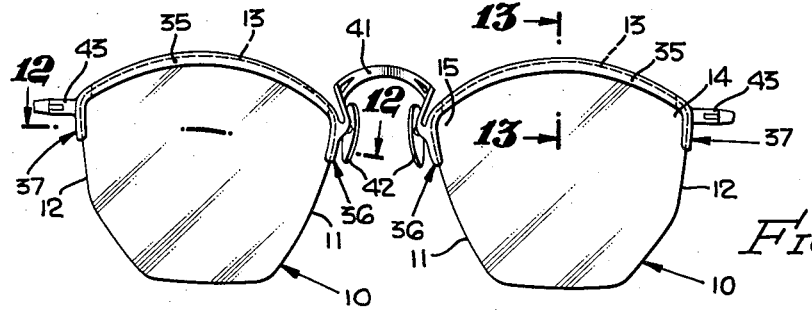
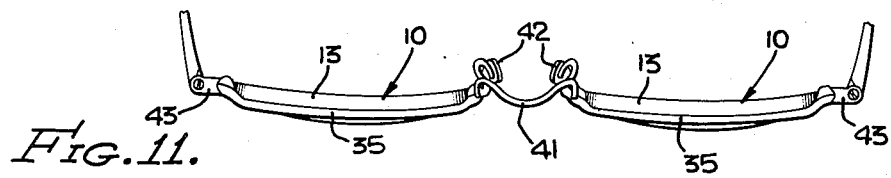
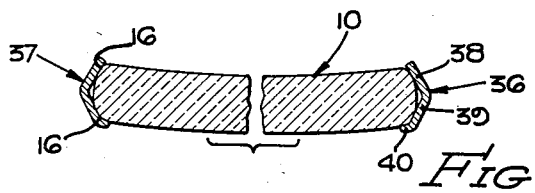
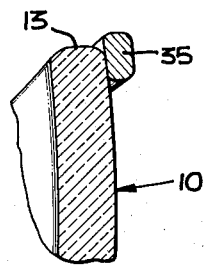
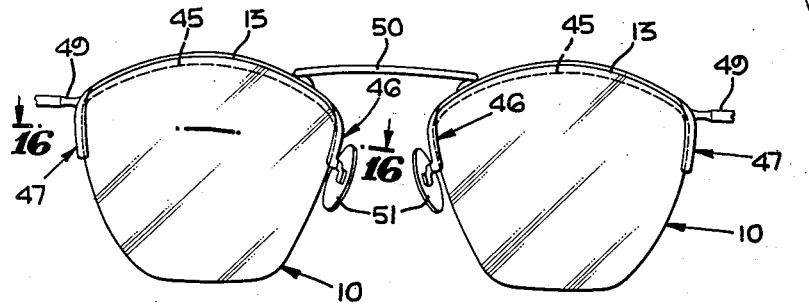
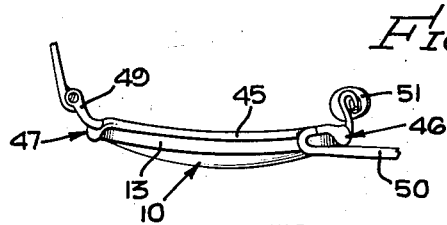
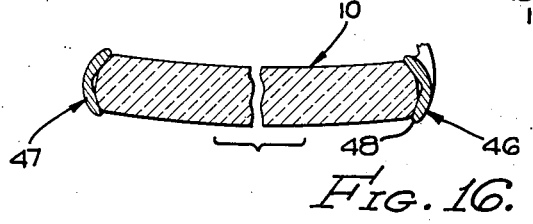

United States Patent Office 2,834,252
Patented May 13, 1958

2,834,252

SEMI-RIMLESS SPECTACLE MOUNTING

Walter F. Morrison, Los Angeles, Calif.

Application February 5, 1951, Serial No. 209,452

8 Claims. (Cl. 88—47)

This invention relates to improvements in mountings for semi-rimless spectacles. The application is a continuation-in-part of my prior application, Serial No. 15,817, filed March 19, 1948, now abandoned.

A primary object of the invention is to provide an improved mounting for the lenses of spectacles which will enable the lenses to be easily installed in the mounting or removed therefrom, the mounting being so designed that when lenses are assembled therewith a pair of spectacles is produced wherein the mounting is highly inconspicuous.

Explanatory of the present invention after the prescription of the wearer has been ground on the lens, the lens is then edge-ground to the desired shape. The edge-grinding operation is usually performed on an automatic edger wherein each lens is clamped and rotated against the edge of a grinding wheel. A template having the shape desired is used to control the movements of the lens against the grinding wheel so that when the edge-grinding operation on the automatic edger is completed the lens will have the shape corresponding to the template. When the edge grinding on the automatic edger is completed the lens is usually held by hand against the grinding wheel to grind off the sharp corners and to give to the edge slight bevels. In addition to the slight bevels there may be safety bevels ground on the lens edge. The bevel and safety bevels usually are very short hand operations designed to render the lens less fragile.

Heretofore when the edge-grinding operations performed by the automatic edger and the beveling operations were completed an additional operation was ordinarily required in order to be able to mount the lens on a mounting to produce rimless or semi-rimless spectacles. Formerly one or more holes had to be drilled in each lens near the edge thereof to receive fastening screws. More recently, instead of drilling holes in the lenses one or more notches were ground in the edge of the lens by which it might be fastened in the mounting or frame. In some instances it was proposed to drill or otherwise form small recesses in the faces of the lenses near the edges thereof to provide for the attachment of the mounting. The drilling of holes in the lens or the grinding of notches in the lens edge or the formation of recesses in the faces of the lens near the edge thereof had the objection of materially weakening the lens and, in the case of rimless spectacles, the hole drilled near the edge of the lens to receive the fastening screw formed a severe weakness inasmuch as this constituted the only means of support for the lens in the mounting. Where the lens was notched or recesses were formed in the faces of the lens, the notches or recesses also contributed to weakening the lens. The drilling of holes or the grinding of notches or recesses required an additional operation on each lens after the edge-grinding operations were completed and, as above explained, such additional operations merely serve to weaken the lens in order to afford a means for mounting the lens in the mounting.

By means of the present invention the drilling of holes or the grinding of notches or the cutting of recesses in the lens after the completion of the edging operations can be entirely avoided. Consequently, the lenses will not be weakened but will retain their original strength that they possess on completion of the edging operations.

In accordance with the present invention the mounting is so designed as to be directly engageable with edge surfaces on the lenses as produced on the completion of the edging operations. This enables lenses to be easily slipped into place in the mounting and removed therefrom. While the lenses are in the mounting they will be firmly retained in place therein. The ease with which the lenses can be slipped into or out of the mounting enables a purchaser of spectacles to exercise a wide opportunity of selection from numerous styles and types of mountings in that if the lenses are tried on one mounting and the purchaser expresses a preference for a different style of mounting, the lenses can be easily and quickly removed from the first mounting and applied to the selected mounting.

With the foregoing and other objects in view, which will be made manifest in the following detailed description and specifically pointed out in the appended claims, reference is had to the accompanying drawings for an illustrative embodiment of the invention, wherein:

Fig. 10 is a front view in elevation of another pair of spectacles having a mounting made in accordance with the present invention;

Fig. 11 is a top plan view of the same;

Fig. 12 is a sectional view taken substantially upon the line 12—12 upon Fig. 10 in the direction indicated;

Fig. 13 is a vertical section taken substantially upon the line 13—13 upon Fig. 10;

Fig. 14 is a front view in elevation illustrating still another form of mounting made to embody the present invention;

Fig. 15 is a partial top plan view of that form of construction illustrated in Fig. 14; and Fig. 16 is a horizontal section taken substantially upon the line 16—16 upon Fig. 14.

Figure 1:
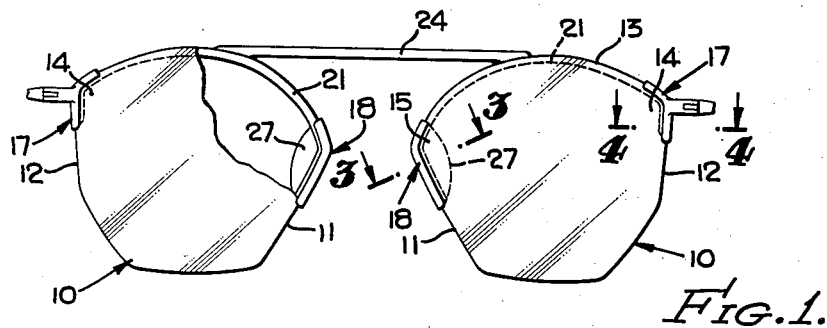
Figure 1 is a view in front elevation of a pair of spectacles embodying one form of the present invention.

Referring to the accompanying drawings wherein similar reference characters designate similar parts throughout, the reference character 10 indicates the lenses which may be presumed to have been selected or to have been ground to the prescription of the wearer. Each lens, after having the prescription ground thereon, is then edge-ground to the desired size and shape and in accordance with presently prevailing styles of rimless or semi-rimless spectacles, each lens may be edge-ground to approximately the size and shape illustrated. It will to be understood, however, that the invention is not restricted to lenses of this particular shape other than that each lens shall be characterized by having two opposed convex edge formations below which there are downwardly converging side edges indicated at 11 and 12, respectively. These downwardly converging side edges are joined by a curved top edge 13 so that at the upper corners of the lenses there are convex edge formations 14 and 15 generally in the form of an obtuse angle.

In the edge grinding of lenses of this character, the lens with the prescription or correction ground thereon has its periphery rotated against a grinding wheel and the movements of the lens with relation to the grinding wheel are governed or controlled by a template having the size and shape of the finished lens. Such edge grinding as is performed by the automatic edger grinds the edges of the lens at right angles to the plane of the lens or substantially so and thereafter the corners formed at the juncture between the side edges and the faces of the lens are usually ground off slightly manually to form a bevel such as that indicated at 16. In addition to the bevel thus ground, safety bevels may also be manually ground at these corners with the result that the corners between the side edges of the lenses and the faces of the lenses are not left sharp but are slightly rounded or beveled to avoid weakening the lens. When these bevels and safety bevels are ground on the lenses after they are edge ground on the automatic edger, the lenses may be regarded as having been completed in that no notches, holes or recesses are thereafter ground in the lenses nor are any special edging operations performed to produce special protuberances on the edges of the lenses.

Figure 7:
Figs. 7, 8 and 9 are sectional views illustrating alternative cross sectional shapes that may be employed on the sockets forming parts of the present mounting.
Figure 8:
Figure 9:

The mounting embodying the present invention utilizes the convexities 14 and 15 normally or naturally formed on the lenses by the automatic edger and takes advantage of the downwardly converging side edges 11 and 12. In the mounting as shown in Fig. 1, sockets 17 and 18 are provided for the convex edge formations 14 and 15. These sockets may be regarded as generally angular in plan or as viewed from the front of the spectacles so as to be generally complementary to the convex edge formations 14 and 15, respectively. In addition to being thus concave toward the convexities 14 and 15 the sockets are also concave in transverse section as illustrated at 19 on Fig. 3, and at 20 on Fig. 4. The cross sectional shape of each socket, however, may vary considerably and typical alternative cross sectional shapes are illustrated in Figs. 7, 8 and 9. Other cross sectional shapes may be adopted if desired.

Figure 2:
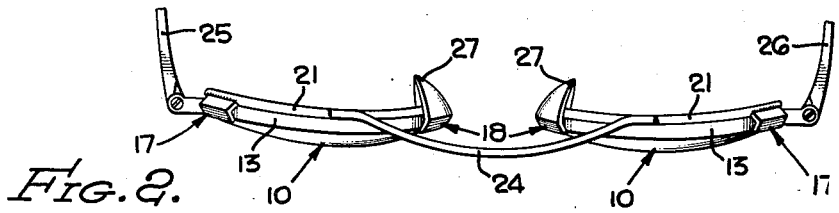
Fig. 2 is a top plan view of the same.
Figure 3:
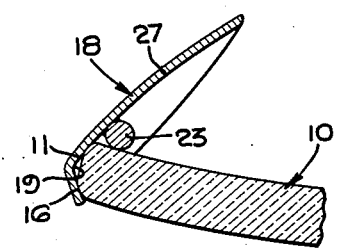
Fig. 3 is a partial view in section taken substantially upon the line 3—3 upon Fig. 1 in the direction indicated.
Figure 4:
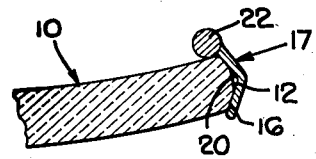
Fig. 4 is a sectional view taken substantially upon the line 4—4 upon Fig. 1 in the direction indicated.

A wire bow 21 connects the sockets for each lens and is disposed adjacent the top edge thereof. In that form of mounting illustrated in Fig. 1, the wire bow is disposed against the rear face of the lens 10 immediately below the top edge 13 thereof. One end of the bow is fastened adjacent the rear side of socket 17 as indicated at 22 forming an inwardly extending flange or abutment at the back of this socket against which the lens 10 may be crowded as illustrated in Fig. 4. In a similar manner the other end of the bow may be fastened as indicated at 23 to the rear side of socket 18 forming a similar flange or abutment against which the lens may be crowded as illustrated in Fig. 3. The wire bow 21, while being quite stiff, nevertheless possesses some resiliency so that on springing the bow the sockets may be separated or spread apart a sufficient distance to enable the lens to be slipped into the mounting or removed therefrom. When a lens 10 is in applied position and the sockets are released, the resiliency of the bow serves to yieldably urge the sockets into firm gripping engagement with the convex edge formations 14 and 15, thus retaining each lens in place. The two bows 21 may be connected together such as by a wire bridge 24 and hinges for temples when employed, indicated at 25 and 26, may be secured to the outer sockets 17. In that form of construction shown in Figs. 1 to 3, inclusive, the rear sides of the inner sockets 18 are extended as indicated at 27 so as to form nose pads integral with the inner sockets and which are engageable with the sides of the wearer's nose.

From the above described construction it will be appreciated that the bow 21 assumes a position against a face of the lens adjacent the top edge thereof and that the sockets 17 and 18 are laterally offset with relation to the length of the bow so as to straddle the edges of the lens at the convexities. The abutment or flange afforded by the ends of the bow at 22 and 23 is disposed on the same side of the sockets as that on which the bow itself is disposed. This small abutment bearing against the face of the lens at the convexities 14 and 15 is effective to prevent tilting or tipping of the lens with relation to the sockets. As the sockets are complementary to the downwardly converging side edges 11 and 12 each lens is effectively restrained against dropping from between the sockets and as the sockets extend slightly onto the top edge 13 upward movement of the lens with relation to the sockets is effectively prevented.

It will be appreciated also from the above described construction that when the edge-grinding operation on the lens is completed on the automatic edger and the beveling operations are thereafter performed, it is not necessary thereafter to perform any additional operation such as drilling a hole in the body of the lens to receive a fastening screw or to grind one or more notches in the edges of the lens or to otherwise form any recesses or special protuberances. Instead the convexities or upper corners on the lens as produced on the automatic edger are utilized so that the lens when beveled retains its maximum strength. For a given size and shape of lens a number of different styles of mountings may be kept in stock and upon selection by the wearer of a preferred style of mounting the lenses may be easily and quickly fitted into any one of them or removed from one mounting and easily applied to another.

Figure 5:
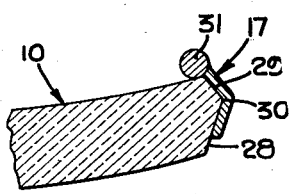
Fig. 5 is a similar view to Fig. 4 but illustrating the manner in which the present invention may be used with lenses which are unusually thick adjacent their edges.

In some instances the edges of the lenses are unusually thick as illustrated in Fig. 5 and when this is the case the lenses, after having been edge ground on the automatic edger to the desired size and shape, have the corners beveled off as indicated at 28 and 29 on Fig. 5, defining a ridge 30. This ridge may be located only at the upper corners of the lens or at the location of the protuberances but usually the beveling at 28 and 29 to form the ridge 30 will extend entirely around the lens. The ridge at 30 is receivable in each of the sockets and by reason of the configuration of the lens and the configuration of the sockets, the lens will be effectively clamped between the sockets even though the overall thickness of the lens is greater than the width of the socket. In this form of construction as well as that previously described, the end of the resilient bow indicated at 31 provides an abutment engageable with the face of the lens along the side of the socket.

On the other hand, if the lenses are extremely thin near the edges thereof, the extremely thin edges will tend to center themselves in the concave cross sectional shape of the sockets. Exceptionally thick lenses offer no severe problem as illustrated in Fig. 5 inasmuch as it is merely necessary to extend or deepen the bevel usually applied to the lenses on completion of the edge-grinding operation performed by the automatic edger.

Figure 6:
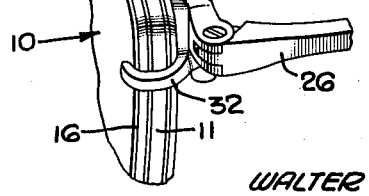
Fig. 6 is a partial view in perspective illustrating an alternative form of construction.

In Fig. 6 an alternative form of construction is provided wherein the concave sockets, designed to receive the outer convex edge formations 14 and 15, are formed by claws 32. One arm of each claw is engageable over the top edge 13 of each lens and the other arm is receivable over a side edge of the lens. Inasmuch as the side edges 11 and 12 converge downwardly, the side arms of the claws effectively prevent the lenses from dropping out of the sockets formed by the claws.

In Figs. 10 to 13, inclusive, a preferred form of construction is disclosed wherein the lenses 10 are edge ground on an automatic edger as previously described and are then beveled manually at the corners between the said edges and the faces of the lens in conformity with general practice. In this form of construction the resilient bows 35 are formed of resilient wire shaped to conform generally to the top edge 13 of each lens. The wire, although initially round, may be flattened so that in cross sectional shape it will be of greater height than thickness. This flattening, while preferred, is not essential and is done to impart greater stiffness to the wire against bending in the vertical plane.

In the form illustrated in Figs. 10 to 13, the bow 35 for each lens assumes a position lying against the forward face of the lens adjacent the top edge 13. The ends of each bow are offset or bent rearwardly to form the sockets 36 and 37. The metal of the wire in these offset portions is then stamped or otherwise deformed to form the sockets which are generally angular in cross section, as shown in Fig. 12, having angularly related sides 38 and 39, the forward side being equipped with a very small integral flange 40 engageable with the forward face of the lens. The shape of the sockets, when considered in elevation and viewing the mounting from the forward side thereof, conforms to the shape of the convexities 14 and 15, that is, the sockets thus formed integrally with the bows have portions complementary to the downwardly converging side edges 11 and 12 and portions which also extend toward each other slightly onto the top edge 13. In this form of construction the two bows are connected to each other by any suitable bridge indicated at 41, and nose pads 42 may be mounted either on the ends of the bridge or on the inner sockets. Where temples are employed the temple hings 43 may be attached to the outer sockets. The attachment of the bridge and temple hinges as well as the nose pads may be accomplished in any conventional or preferred manner such as, for example, by soldering. In this form of construction it will be observed that the flange or abutment at 40 is located on the same side of the socket as the body of the bow 35 and performs the same function previously explained, preventing lenses from being tilted or tipped out of the sockets.

The form of construction illustrated in Figs. 14 to 16, inclusive, is largely but a converse arrangement of that illustrated in Figs. 11 to 13, inclusive, wherein the bows 45 are similarly formed of flattened wire and are positioned against the rear face of the lens adjacent the top edge 13 thereof. In this form of construction the ends of the bows are offset forwardly instead of rearwardly, as in the construction depicted in Figs. 10 to 13. The sockets 46 and 47 are formed integrally with the ends of the bows in the same manner as previously explained and engage the convexities 14 and 15 on the lenses in the same manner. In this form of construction the only difference from that illustrated in Figs. 10 to 13 resides in the positioning of the bows against the rear faces of the lenses and having the sockets offset forwardly. When the sockets are thus offset the flanges 48 corresponding to the flanges 40 engage the rear face of the lens adjacent the convexities and are positioned against the same face of the lens as that on which the bows 45 are positioned. In this form of construction the mounting may be optionally equipped with hinges 49 for temples and the bows are connected by a suitable bridge 50. The nose pads illustrated in this form of construction, indicated at 51, may be formed of a synthetic resin plastic and are attached to the inner sockets by merely dipping the inner sockets in such plastic while in a liquid condition and then shaping the plastic to shape and allowing it to harden.

From the above described constructions it will be appreciated that the improved spectacles are highly advantageous in that the number of operations required to be performed on the lenses can be materially reduced. The lenses are not weakened at or adjacent their edges by the drilling of holes or the grinding of notches therein. In addition, the application of a lens to or the removal of a lens from a given mounting can be easily accomplished by merely springing the bow. However, when the bow is released to contract the sockets on the convexities of the lenses, each lens is firmly gripped by the sockets so that the lens in the course of ordinary usage will not be released. The sockets themselves are relatively small and as the bow occupies a position closely adjacent the top edge of the lens the mounting itself is highly inconspicuous.

Various changes may be made in the details of the construction without departing from the spirit and scope of the invention as defined by the appended claims.

I claim:

1. In rimless spectacles, a pair of lenses each having two corners positioned on opposite sides of each of said lenses and above its datum line, two lens-bars, two pairs of tongues carried by each of said lens-bars and extending over the edge of said lens, one tongue of each pair lying above and the other tongue of said pair lying below one of said corners, said corners protruding laterally beyond said tongues, said corners being defined by the top edge of said lens and by side edges converging downwardly from said top edge.

2. In rimless spectacles, a pair of lenses, two lens-bars each lying behind the corresponding lens, a pair of clips carried by each end of each lens-bar, one of said clips of each pair engaging the upper portion of the edge of the corresponding lens and the other clip of said pair engaging the adjacent side portion of said edge, and corners formed at the junctions of said upper and side portions and protruding laterally beyond said clips, said corners being defined by the top edge of said lens and by side edges converging downwardly from said top edge.

3. Spectacles comprising a pair of lenses, each lens having its edges at the upper corners thereof in the form of obtuse angled convexities, the sides of which converge downwardly and the tops of which extend towards each other and form portions of the top edges of the lenses, sockets adapted to receive said convexities, said sockets being transversely concave across the side edges of the lenses and being angular in plan providing portions complementary to the downwardly converging side edges of the convexities and portions complementary to the tops of the convexities, resilient means connecting the sockets for each lens to each other serving to urge the sockets into clamping engagment upon the convexities, and means connecting the resilient means to each other.

4. Spectacles comprising a pair of lenses, each lens having its edges at the upper corners thereof in the form of obtuse angled convexities, the sides of which converge downwardly and the tops of which extend towards each other and form portions of the top edges of the lenses, sockets adapted to receive said convexities, said sockets being in the form of obtuse angled channels which are transversely concave across the edges of the lenses and have downwardly extending portions engageable with and complementary to the downwardly converging side edges of the convexities, and upper portions engageable with and complementary to the tops of the convexities, resilient means connecting the sockets for each lens to each other serving to urge the sockets into clamping engagement upon the convexities thus forming a supporting means for each lens, and means connecting the supporting means for the lenses to each other.

5. A mounting for lenses of spectacles which have edges shaped to provide obtuse angled convexities at the upper corners thereof, the sides of which converge downwardly and the tops of which form portions of the top edges of the lenses comprising a pair of opposed sockets for each lens, the sockets of each pair being angular in plan and being transversely concave towards each other and having portions complementary to the downwardly converging sides of the convexities and portions complementary to the tops of the convexities, resilient means connecting the sockets of each pair together arranged to be disposed adjacent the top edge of a lens inserted therebetween and serving to urge the sockets into clamping engagement upon the convexities thus forming a support for the lenses, and means connecting the supports for the lenses to each other.

6. Spectacles comprising a pair of lenses, each lens having a non-indented marginal edge shape of the type capable of being produced by an automatic edger, the side edges of each lens converging downwardly with respect to each other and cooperating with the top edge to define corners, transversely concave sockets adjacent the corners, each socket having a portion extending across the side edge of the lens adjacent the corner and another portion extending across the top edge of the lens adjacent the corner, resilient means for each lens connecting the sockets on each lens to each other and urging the sockets towards each other into clamping engagement with the side edges of the lens, said resilient means being arranged adjacent the top edge of the lens, and means connecting the resilient means and sockets for one lens to the resilient means and sockets for the other lens.

7. A spectacle mounting for a pair of lenses each of which have their edges non-indented and edge-ground on an automatic edger and which have side edges which converge downwardly relatively to each other and which cooperate with the top edge of the lens to form upper corners, said mounting comprising a pair of sockets transversely concave to receive portions of the side edges of the lenses adjacent the corners and having portions extending over the top edge adjacent the corners, a resilient connector connecting the sockets for each lens and serving to urge them towards each other to clampingly engage the side edges of their respective lenses, said resilient connectors being arranged to be disposed adjacent the top edges of their respective lenses, and means connecting the resilient connector and sockets for one lens to the resilient connector and sockets for the other lens.

8. A spectacle mounting for a pair of lenses each of which have their edges non-indented and edge-ground on an automatic edger and which have side edges which converge downwardly relatively to each other and which cooperate with the top edge of the lens to form upper corners, said mounting comprising a pair of sockets transversely concave to receive portions of the side edges of the lenses adjacent the corners and having portions extending ovr the top edge adjacent the corners, a resilient connector connecting the sockets for each lens and serving to urge them towards each other to clampingly engage the side edges of their respective lenses, said resilient connectors being arranged to be disposed adjacent to but slightly behind the top edges of their respective lenses, and means connecting the resilient connector and sockets for one lens to the resilient connector and sockets for the other lens.

References Cited in the file of this patent
UNITED STATES PATENTS

| | | |
|---|---|---|
| 945,513 | Green | Apr. 12, 1910 |
| 2,035,195 | Scherer | Mar. 24, 1936 |
| 2,277,118 | Leavitt | Mar. 24, 1942 |
| 2,383,572 | Splaine et al. | Aug. 28, 1945 |
| 2,456,293 | Markell | Dec. 14, 1948 |
| 2,482,664 | Gagnon | Sept. 20, 1949 |